United States Patent [19]

Ziaylek, Jr.

[11] 4,445,163
[45] Apr. 24, 1984

[54] BOAT LIGHT, ESPECIALLY FOR TRANSOM MOUNTING

[76] Inventor: Theodore Ziaylek, Jr., 140 Riverview Dr., Yardley, Pa. 19067

[21] Appl. No.: 371,903

[22] Filed: Apr. 26, 1982

Related U.S. Application Data

[63] Continuation-in-part of Ser. No. 204,449, Nov. 6, 1980, Pat. No. 4,360,859, which is a continuation-in-part of Ser. No. 872,522, Jan. 26, 1978, Pat. No. 4,245,281.

[51] Int. Cl.³ ............... F21V 17/06; F21V 31/02; F21S 1/02
[52] U.S. Cl. .................. 362/287; 116/202; 248/288.3; 340/50; 362/61; 362/267; 362/294; 362/365; 362/372; 403/90
[58] Field of Search ............ 362/61, 80, 267, 269, 362/275, 277, 278, 282, 283, 285, 287, 294, 319, 320, 322, 364, 365, 368, 372, 418, 421, 427, 433, 369; 248/27.1, 178, 180, 181, 288.3, 481; 403/90, 122, 143; 340/29, 50, 84, 87; 116/26, 28 R, 51, 202; 180/90

[56] References Cited

U.S. PATENT DOCUMENTS

| | | | |
|---|---|---|---|
| 2,334,899 | 11/1943 | Bosten et al. | 362/267 X |
| 2,504,866 | 4/1950 | Morse | 362/61 |
| 2,619,582 | 11/1952 | Morse | 362/267 |
| 2,782,295 | 2/1957 | Schwenkler | 362/372 X |
| 2,800,575 | 7/1957 | Robertson et al. | 362/267 |
| 2,966,579 | 12/1960 | Malec | 362/369 |
| 3,053,337 | 9/1962 | Prohaska et al. | 362/80 X |
| 3,319,982 | 5/1967 | Schwartz | 403/90 |
| 3,803,400 | 4/1974 | Ozawa | 362/372 |
| 4,142,227 | 2/1979 | Aikens | 362/364 X |
| 4,198,027 | 4/1980 | Urbanek | 362/61 |

FOREIGN PATENT DOCUMENTS

401632 11/1933 United Kingdom .
1402329 8/1975 United Kingdom .

*Primary Examiner*—David H. Brown
*Assistant Examiner*—John E. Griffiths, Jr.
*Attorney, Agent, or Firm*—Frederick A. Zoda; John J. Kane

[57] ABSTRACT

A boat light is especially adapted to be mounted upon the transom or stern of a cabin cruiser, speedboat, small yacht, or the like. A holder for a lamp unit has a spherically curved outer surface engaging a complementary inner surface of a housing attachable to the hull of the boat. The holder is universally adjustable to selected angular positions of adjustment relative to the housing. In a typical adjustment, the beam of the lamp unit may be projected horizontally despite the inclination of the transom from the vertical. In the selected position of adjustment, the tightening of screws by which the device is assembled and mounted on the transom is effective to preserve the lamp unit holder adjustment. This occurs when a shield closing the inner end of the housing is caused to bear against a rearwardly projecting surface of the holder. The holder, or at least the shield-engaging surface thereof, is of a deformable material. The shield, when the screws are tightened, deforms and flattens the holder material to bind the holder frictionally against the shield, thus to preserve the selected adjustment.

9 Claims, 4 Drawing Figures

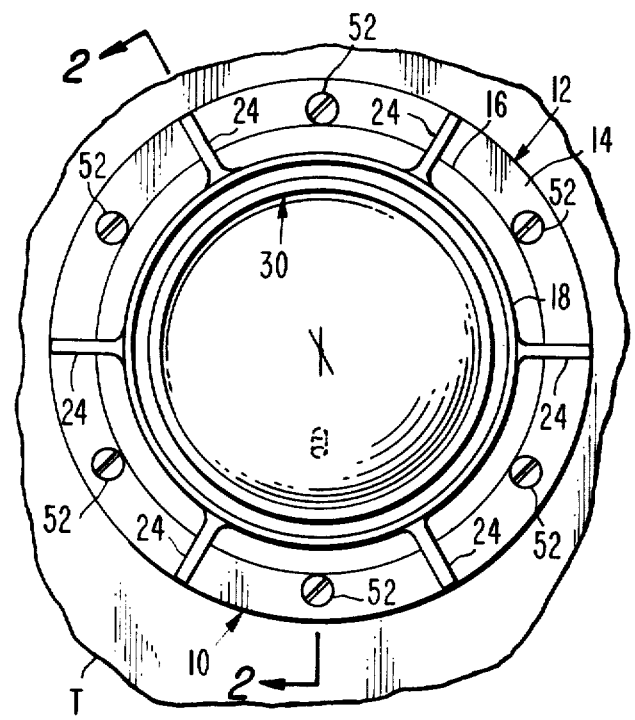
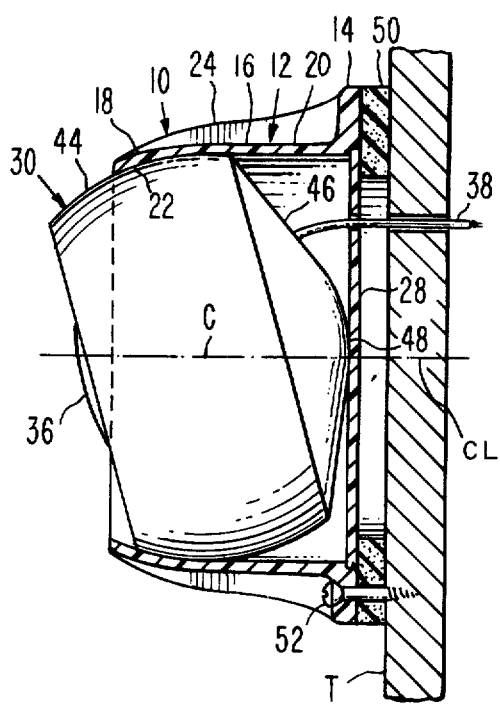
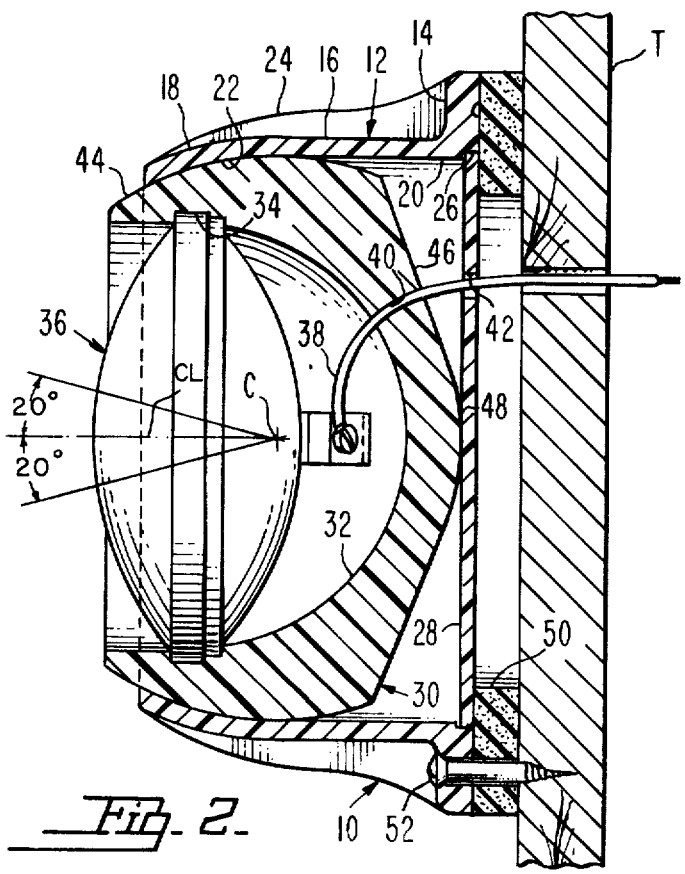
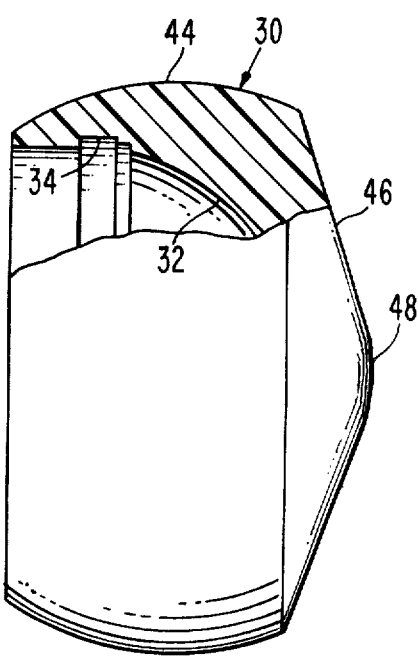
Fig. 1.
Fig. 2.
Fig. 3.
Fig. 4.

BOAT LIGHT, ESPECIALLY FOR TRANSOM MOUNTING

CROSS-REFERENCE TO RELATED APPLICATIONS

The present application is a continuation-in-part of application Ser. No. 204,449 filed Nov. 6, 1980, now U.S. Pat. No. 4,360,859 issued Nov. 23, 1982, which itself is a continuation-in-part of application Ser. No. 872,522 filed Jan. 26, 1978, now U.S. Pat. No. 4,245,281 issued Jan. 13, 1981.

BACKGROUND OF THE INVENTION

1. Field of the Invention

In a general sense, the present invention relates to boat lights mounted on the hulls of cabin cruisers and similar water craft. In a more particular sense, the invention relates to the field of illumination and especially to lamp mountings coming within this category, of the kind providing supports for head lamp units and further adapted for adjustment of the supported units to project their beams along a desired path. The support means for the head lamp unit includes at least one member of a deformable or flexible material. The support means may accordingly be appropriately classified among those patents relating to illuminating devices or their supports with flexible, adjustably positioned modifiers.

2. Description of the Prior Art

It has been heretofore proposed to provide lamp units for mounting upon the hulls of small vessels. It has been suggested that these be mounted to permit adjustment for the purpose of directing their beams along selected paths. Some of the prior art devices have been of the recessed type, but these are not suitable for use at some locations. Recessing the unit in the transom, for example, may cause the unit to project into the cockpit or other open space intended to remain fully accessible to the passengers or crew.

The prior art further fails to show a highly simplified yet rugged boat light, especially adapted to be transom-mounted, in which any of various universal adjustments can be made relative to the mounting, to compensate for the inclination of the transom and assure the projection of the light beams along horizontal paths or, for that matter, paths that depart from the horizontal to an extent preferred by the particular boat owner.

SUMMARY OF THE INVENTION

The invention may be briefly summarized as a boat light especially well adapted for surface mounting on a transom (though some circumstances be utilized in a mounting of the recessed type). To this end, the invention comprises a generally cylindrical housing, having an inner end adapted to be closed by a protective shield. The housing is adapted to be secured to the transom of the boat hull.

Within the outer end of the housing, there is mounted a lamp unit holder, of the so-called "eyeball" type, having a spherically curved outer surface complementing a correspondingly curved inner surface formed in the outer end portion of the housing. A lamp unit is releasably gripped within the holder to facilitate ready interchange of said units, which are per se conventional. The holder, at its inner end, has a shallowly conical end wall, the apex of which is rounded off. The rounded area of the end wall of the holder is spherically curved. When the screws are tightened to mount the device upon the transom, the shield bears against the curved area of the holder end wall and compressibly deforms the material of the holder. This flattens the engaged area of the holder into tight frictional contact with the surface of the shield. In this way, the selected universal adjustment of the holder is retained.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front elevational view of a boat light according to the present invention, a transom on which the light is mounted being shown fragmentarily;

FIG. 2 is a sectional view through the boat light, substantially on line 2—2 of FIG. 1;

FIG. 3 is a sectional view through the boat light on the same cutting plane as FIG. 2, with the holder being left in side elevation and tiltably adjusted for projection of its beam along a horizontal path despite mounting thereof on an inclined transom; and FIG. 4 is a view, partly in side elevation and partly in section, of the lamp unit holder per se.

DESCRIPTION OF THE PREFERRED EMBODIMENT

Referring to the drawing in detail, the reference character T designates a transom of a cabin cruiser, speedboat, or similar water craft. This, according to the design of the particular craft, may be substantially vertically disposed as in FIG. 2 or alternatively, may be inclined in one or the other direction from the vertical, as shown by way of example in FIG. 3.

The boat light comprising the present invention has been generally designated 10. It includes a housing generally designated 12, preferably formed of a molded plastic material. A suitable material, for example, is "Rovel 701", a product of UniRoyal Corp.

The housing is of a rigid material, and in the preferred embodiment includes a generally flat, annular base 14. Molded integrally with and projecting outwardly from base 14 is a cylindrical skirt 16 having a tapered outer end portion 18 merging into an inner end portion 20 that is of a constant diameter both internally and externally thereof. The inner surface of end portion 18 is spherically curved as at 22, about a center C located well forwardly of the inner end of the housing.

Strengthening the housing is an annular series of uniformly, angularly spaced, radial ribs or gussets 24 molded integrally with the skirt 16 and base 14.

In the inner end of the housing (see FIG. 2), there is formed a shallow, continuous recess 26 adapted to receive a flat, circular retaining plate or shield 28. Shield 28 in a preferred embodiment is of a flame, arc, and ozone resistant polyester material, and when seated in the recess 26, closes the inner end of the housing, in a position in which it bears against the inner end wall of a lamp unit holder generally designated 30.

Holder 30 is of the so-called "eyeball" type, having a forwardly opening, approximately hemispherical recess 32 in the wall of which is formed a stepped mounting groove 34 for a sealed beam lamp unit generally designated 36.

Lamp unit 36 is conventional per se, and includes a cord 38, extendable through an opening 40 formed in the inner end wall of the holder 30. Cord 38 also extends through an opening 42 formed in the shield 28, and through a suitable opening formed in the transom, for connection of the lamp unit to a source of electrical power, not shown.

The outer surface 44 of the holder 30 is spherically curved correspondingly to the curvature of the inner surface 22 of skirt 16. Surfaces 22, 44 are curved about the common center C, thus to permit universal angular adjustment of the holder within the housing. Preferably, said adjustments are limited to approximately 20° in any direction from a center line CL on which center C falls, and which intersects the plane of shield 28 at the center of the shield, perpendicularly to the shield plane.

The holder is formed of a silicone material, preferably of approximately 50 durometer, so as to permit the holder to be compressibly deformed, or otherwise flexed to an extent necessary to permit the lamp unit 36 to be snapped into the stepped groove 34. This causes the lamp unit to be effectively gripped within and by the holder. When the lamp unit burns out, it can be readily replaced by detaching the boat light from the transom, to facilitate removal of the shield and withdraw all of the holder through the now open inner end of the housing. In these circumstances, a burned-out lamp unit can be effectively and readily removed from the holder by the user's flexing the holder material out of engagement with the lamp unit, after which a new lamp unit can be snapped into the stepped groove.

The formation of the holder from a deformable material has another important purpose. As shown, the holder includes an inner end wall 46 which exteriorly is shallowly conical in the preferred, illustrated embodiment. The center area or apex portion 48 of the end wall is rounded off, being spherically curved about the center C. When the device is fully assembled, as in FIGS. 2 and 3, and mounted upon the transom, the rounded area 48 is flattened by the shield 28, being thus brought into tight frictional contact therewith. This preserves any angular adjustment of the holder that has been selected by the user.

Completing the assembly is an annular gasket 50 formed of a foam rubber material, having openings registering with uniformly, angularly spaced openings of base 14 to receive mounting screws 52 extendable into the transom T.

In use, and assuming that the transom is substantially vertical and that it is desired that the lamp unit 36 project its beam rearwardly from the stern of the vessel in an approximately horizontal path parallelling the water surface, one first adjusts the holder 36 within housing 16 to a selected position relative to the housing. These adjustments are universal, so that the beam can be projected not only upwardly or downwardly, but also to port or starboard, as desired. In FIG. 2, a centered position of the holder has been selected.

With the holder so adjusted, and with the shield and gasket assembled loosely with the housing 12, screws 52 are threaded into the transom. When the screws are tightened, they compress the gasket 50, and force the shield 28 against the inner end of the holder 30. In particular, the shield contacts the spherically rounded center area 48 of the inner end wall 46 of the holder. It may be noted at this point that the radius about which the central area 48 is spherically curved is slightly greater than the linear distance measured between the center C and the plane of the inner surface of the shield 28, measured along the line CL. As a result, the shield 28 is caused to press tightly against the surface 48, compressibly deforming the same to a flattened condition illustrated in FIGS. 2 and 3. This binds the holder frictionally against the inner surface of the shield, to preserve the adjustment selected for the holder 30.

In FIG. 3, the transom T has been illustrated as being inclined substantially from the vertical. Assuming that it is desired again to project the beam of the lamp unit horizontally rearwardly from the vessel's stern, the holder is adjusted to so dispose the lamp unit. Then, once again the screws 52 are turned home to tighten the entire assembly and thereby bind the shield frictionally against the now flattened surface 48.

Normally, when an adjustment is made, it is left undisturbed indefinitely, for example, until the lamp unit burns out and needs replacement.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A boat light, especially adapted for mounting on the transom of a boat, comprising:
   (a) a housing including a skirt having a curved inner surface;
   (b) a shield closing the housing at one end;
   (c) a lamp unit holder in the other end of the housing, said holder having an outer surface curved correspondingly to and movably contacting the inner surface of the housing, whereby said holder may be adjusted to selected angular positions relative to the housing;
   (d) a lamp unit carried by the holder; and
   (e) means for affixing the housing to the hull of a boat, the shield engaging the holder against movement from each position to which the holder is adjusted, the holder being formed, at least in the area in which it is engaged by the shield, of a material adapted to be compressibly deformed into a tight frictional contact with the shield.

2. A boat light as in claim 1 wherein said surfaces of the housing and holder are spherically curved for universal adjustment of the holder within the housing.

3. A boat light as in claim 2 wherein said surfaces of the housing and holder are curved about a common center.

4. A boat light as in claim 3 wherein said center is located forwardly of the shield.

5. A boat light as in claim 4 wherein said shield is flat and the center falls on a line perpendicular to the plane in which the shield lies.

6. A boat light as in claim 5 wherein the housing and shield are circular and said line passes through the center of the shield.

7. A boat light as in claim 6 wherein the area of the holder engaged by the shield is curved, in the uncompressed condition of said area, about the same center as said spherically curved surfaces of the holder and housing.

8. A boat light as in claim 7 wherein the center about which said area of the holder is curved is spaced away from the shield a distance less than the radius of the curvature of said area whereby to compressibly deform said area to a flattened condition at the location at which it is engaged by the shield.

9. A boat light as in claim 8 wherein said means for affixing the housing to a boat hull is adapted to be loosened to relieve the engagement between the holder and shield sufficiently to permit said adjustment of the holder, said means when tightened being adapted to draw the holder, shield, and housing together to bind the holder frictionally against the shield and thereby retain the holder in a selected position of adjustment.

* * * * *